Inventors:
Henry E. Callaway
Lester K. Olin
By Robert L. Kahn ATTY

United States Patent Office 3,489,193
Patented Jan. 13, 1970

3,489,193
METHOD OF SEPARATING FAT FROM SMALL PIECES OF ANIMAL SKIN AND MEANS FOR ACCOMPLISHING SAME
Henry E. Callaway and Lester K. Olin, Chicago, Ill., assignors to Evans Food Products Co., a corporation of Illinois
Filed Jan. 16, 1967, Ser. No. 609,450
Int. Cl. A47j *43/00*
U.S. Cl. 146—242                                              2 Claims

ABSTRACT OF THE DISCLOSURE

Pieces of animal skin of a size up to about two or three inches on a side can have fat or adipose tissue substantially completely removed therefrom by mechanically beating such pieces in a machine having dull blades. The beating preferably starts with such pieces in a frozen condition. The pieces of animal skin are moved toward the beating region. The beating region is generally at room temperature until the particles of fat assume a physically distinct state. At this time, the mechanical beating has served to thaw such skin particles without damaging them and the mixture of fat and de-fatted skin is a soft, greasy mass. The fat may be separated from the skin by rendering with steam or hot water or acid cured and extracted. The substantially fat-free particles of animal skin may now be used for the manufacture of gelatin or for toasting or frying to form edible pieces generally resembling potato chips but having substantially greater thickness.

---

This invention relates to a method of separating fat from small pieces of animal skin and means for accomplishing same. The substantially fat-free pieces of animal skin may be used in the manufacture of gelatin or may be toasted or fried to provide edible chips. While the invention may be applied to any kind of animal skins, its greatest field of application is in connection with skin remnants from hogs. Such skin remnants are a by-product of the packing industry and are generally removed from various portions of a slaughtered hog.

The skins, as removed from a hog carcass, have layers of fatty tissue attached thereto. The fatty tissue, if separated from the skin, has a ready market and the fat-free skin has substantial value for the manufacture of gelatin, edible chips or the like. Irrespective of the use to which pieces of animal skin are put, the presence of fatty tissue on such skin, particularly pieces of hog skin, is decidedly undesirable and reduces the economic value of the skin. Thus, excess fatty tissue attached to the skin interferes with the chemical procedure in connection with extraction of gelatin from the skin. If pieces of skin are to be used for the manufacture of toasted or fried edible food particles, the presence of fat makes it difficult and frequently impossible to use such skin particles. It is therefore important in the utilization of pieces of skin from animals to remove substantially all of the fat from such skin without damaging the skin part.

While various methods and apparatus are known for removing fat from skin, such methods and apparatus have some inherent and serious drawbacks. Thus, rendering is not entirely satisfactory if the pieces of skin are to be used for the manufacture of gelatin. As a rule, during a rendering process, a substantial part of the gelatin in the skin may also be removed and mixed with the fat. The material removed from the skin by rendering is a mixture of fat and gelatin and the value of the product is greatly depreciated because of the lack of purity. Instead of rendering, the fat may be separated by curing and extraction.

A mechanical method involving fleshing or skinning not only damages the surface of the skin but results in disintegration of a certain amount of skin and mixing such disintegrated skin particles with the fat. In addition, it is desirable to operate the de-fatting procedure on small pieces of skin of the order of about two or three inches on a side to make more complete use of all of the skin from an animal.

In accordance with the present invention, generally blocks of frozen hog skins weighing between about 75 and 100 pounds per block are received from packing plants for processing. Such blocks are first cut into smaller blocks, with the skin pieces being generally rectangular in shape and having a dimension of the order of about 1 inch or 1½ inches on a side. The thickness of the skins is not important for the practice of the invention and, in general, the thickness of the skins may vary depending upon the portions of the carcass from which the skins were originally derived.

The prebroken skin blocks are loaded into the magazine of a beating machine, the process preferably being a batch type although a continuous process is possible. An example of a machine which may be used is a vertical cutter/mixer machine manufactured by the Hobart Manufacturing Company of Troy, Ohio, one model which may be used being Model VCM–120E. A heavier type of model may also be used. In this machine, a bowl-shaped chamber normally sits on an electric motor whose shaft extends up through the bottom of the bowl and spins a two or three bladed scimitar member generally resembling the blades of a fan except that these blades are flat in horizontal plane with the blades rotating in such horizontal plane about a vertical axis. The machine normally has cutting edges on the scimitar blades but in the practice of the present invention, it is essential that the blade edges be dull and have no cutting action.

A cover for the bowl is provided and such cover carries an electric motor driving one or two, as desired, so-called scraping blades which essentially are shaped to conform to the sides of the bowl and rotate about the vertical axis of the bowl against the inside surface of the bowl to scrape material from the inside bowl surface. This blade or blades for scraping are, for purposes of the invention, also dull. The side scraping blades are rotated at a relatively slow speed of the order of 200 or 300 revolutions per minute. The so-called scimitar blades which rotate about the vertical axis of the bowl at or near the bottom thereof operate at a higher speed of the order of about from 1200 to 2400 revolutions per minute. As a rule, the normal slow speed for this model is 1750 revolutions per mintue.

The blocks of broken, frozen skins are loaded into the bowl to the top thereof and, after the cover is bolted down over the bowl, the electric motors for driving the beating blades (scimitar blades) and the bowl's side-scraping blades are started. As a rule, the particular model referred to can accommodate about 75 to 100 pounds of material. After the machine has been operating for about 4 or 5 minutes (beyond a certain point, time is not critical), the entire mass of formerly frozen material has been beaten to a greasy pulp with the temperature thereof above freezing. The thick, greasy mass, as a rule, settles in the bowl to a lower level than the previously prebroken frozen blocks of material.

After the beating has been accomplished and the motors have been stopped, the bowl is turned on trunnions for emptying. Irrespective generally of the use to which the beaten skins are to be put thereafter, the greasy load is put into a kettle where the fat is separated from the skins. In the case of gelatin manufacture, the greasy mass may be treated in well-known fashion by the use of acid curing and extracting procedures to remove the fat and leave the skins. This fat removal is accomplished without substantial damage or removal of gelatin from the skin in accordance with well-known practice. Thereafter the de-fatted skins may be handled in conventional fashion for gelatin recovery.

In the event that the skin particles are to be used for the manufacture of edible chips, the greasy, beaten mass may be fed into a kettle heated by hot water or steam to liquefy the fat and permit the fat to be drawn off. The skin pieces may be fired in grease to crisp, edible chips.

In either case, the fat removed from the skins may be sold either with gelatin mixed in or free from gelatin depending upon commercial requirements. In any event, the frozen blocks of skin and fat need not be thawed out prior to processing as is true in other methods with the result that production goes faster and more economically, and the product at various stages may be handled with ease.

The invention will now be described in connection with the drawing wherein diagrammatic illustrations of the machines for beating the fat from skin pieces is illustrated.

Figure 1:
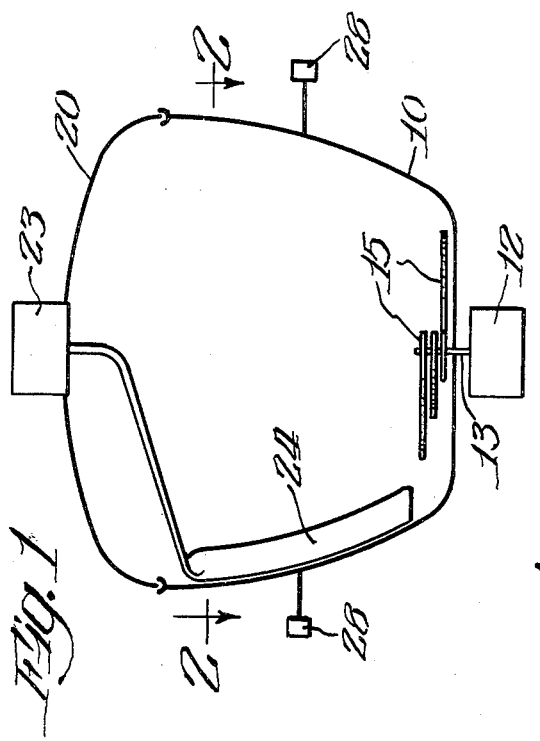
FIG. 1 is an elevation with part of the bowl cut away of a structure for carrying out the new method.
Figure 2:
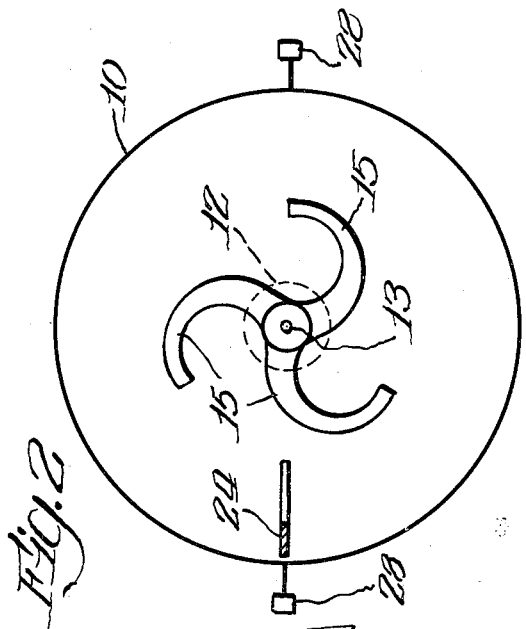
FIG. 2 is a sectional view on line 2—2 of FIG. 1.

Referring to FIGS. 1 and 2, bowl 10, preferably of metal, has electric motor 12 disposed below its bottom. Motor 12 has shaft 13 extending through suitable packing glands into the interior of bowl 10. Shaft 13 carries scimitar-shaped blades 15 which may be two or more in number. The particular model of machine previously identified has two or three blade members. These blades are flat and may either be radial or curved like a scimitar. In any event, the blades are dull and do not have cutting edges. Electric motor 12 will be controlled by suitable switch means and may, if desired, be provided with a speed control.

Bowl 12 has removable cover 20 to permit the cover to be moved for opening or closing the bowl. Cover 20 has electric motor 23 for driving scraper blade or blades 24. As a rule one blade is enough although more may be provided. Scraper blade 24 is a flat blade, free of cutting edges but shaped to conform to the bowl interior, and is rotated along the inside surface of bowl 10 by motor 23. In the actual machine identified above, motor 23 is mounted offside from the bowl and drives scraper blade 24 through reduction gearing. In any event, the scraper blade turns about a normally vertical axis and at a substantially lower speed than scimitar beating blades 15.

At the beginning of an operation, bowl 10 is loaded to the top with pre-broken blocks of skin in frozen condition. Due to the irregular shapes of the blocks, the volume of skin and fat is substantially less than the volume that bowl 10 can normally accommodate. However, after the motors are energized, the agitation of the frozen material results in melting the material and the beating action of blades 15 provides the de-fatting action. It is not essential that the skins be frozen during loading. Scraper blade 24 functions to throw the contents on top of blades 15 with the result that the entire contents of bowl 10 are agitated and beaten. After a run of about 10 minutes, the motors are stopped and the contents inspected. When done, the mass of material in bowl 10 is in the form of a thick, viscous mass which settles into the bowl at a level normally down from the rim of the bowl.

Bowl 10 is mounted on trunnions 28 for permitting the bowl to be tipped and emptied. Cover 20 is raised prior to the tipping operation and the contents of the bowl are directed into a receptacle for further processing. Bowl 10 may empty into a pipe for directing the material to a suitable location.

Figure 3:
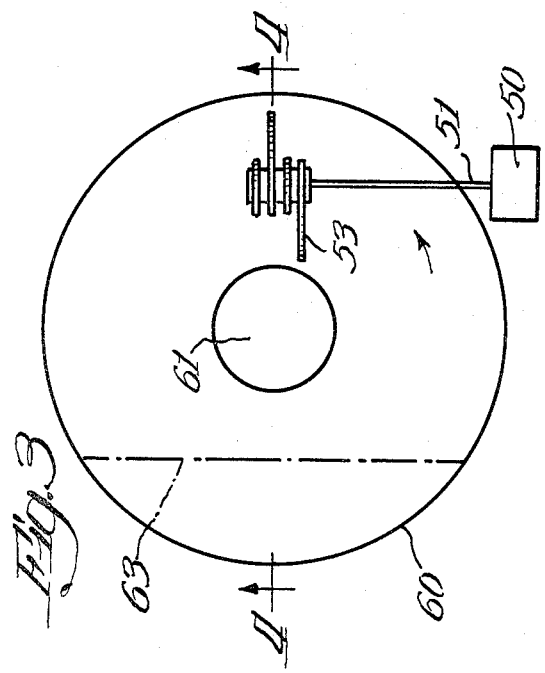
FIG. 3 is a plan view of a modified structure for practicing the new method.

The Hobart machine described above may be replaced by a different type of beating machine illustrated diagrammatically in FIG. 3. This machine has electric motor 50 driving horizontal shaft 51 carrying a bunch of laterally offset rotationally staggered parallel blades 53 spaced from each other along the length of shaft 51. Blades 53 in a machine to be later identified as being available on the market ordinarily has sharp cutting edges. However, in the machine for the practice of the present invention, blades 53 have dull edges. The material to be operated upon by blades 53 is disposed in a horizontal, annular bowl-shaped member 60 having central elevated portion 61 to provide a semi-toroidal or half doughnut-shaped bowl in which material to be operated upon can be disposed. Bowl 60 is revolved slowly about its vertical axis so that the material in the bowl to be beaten is moved into the stationary beating region below blades 53. This particular machine also operates on a batch principle with the contents of bowl 60 to be removed after the entire beating operation has been finished. Such a machine as diagrammatically illustrated is available on the market and is manufactured and sold by Voelker & Co., Inc. of Chicago, Ill., as Model 707 Coolkutter. The particular model available has cutting knives and care must be taken to blunt the cutting edges so that such edges are dull.

Instead of rotating bowl 60 with respect to blades 53, the portion beyond dotted line 63 and away from blades 53 may be cut away and material fed continuously in at one end and withdrawn at the other end of the now stationary bowl portion. With such a continuous process, it is necessary to feed the material carefully and slowly past blades 53 to be sure that beating is at all times complete. The machine as available with a completely circular bowl is a batch type and has the bowl mounted in such a fashion as to permit the same to be emptied after the beating operation is finished. Inasmuch as the beating operation does not require any critical terminating time, batch operation is desirable with the operating time adjusted to accommodate most undesirable operating conditions. With a continuous feed operation, the timing must be such that everything fed into the machine is completely and throughly processed.

The beater blade in the two types of machines previously described are substantially flat with dull edges and rotate about an axis which is substantially perpendicular to the flat of the blade. Thus, in the examples given above, the blade may have a thickness of the order of about ¼ inch. The inability of the blades to cut is due not only to the absence of a sharp cutting edge (ordinarily present in the commercial machines identified) but also to the presence of the fat on the pieces of skin, which fat functions as a lubricant. By rotating the blades in a plane substantially parallel to the blade width, a higher speed of blade rotation is possible without requiring excessive power on the part of the drive motor.

With reference to FIGS. 1 and 2, blades 15 may be straight instead of curved as illustrated. The direction of rotation is not important although for the curved blades illustrated in FIG. 2, clockwise rotation is desirable.

Figure 4:
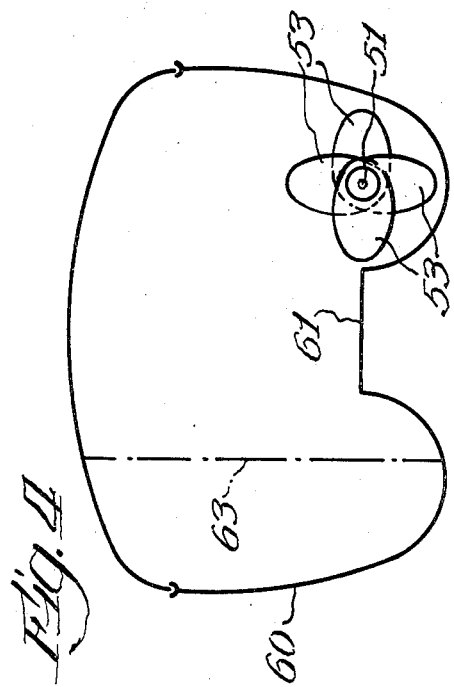
FIG. 4 is a section on line 4—4 of FIG. 3.

With reference to FIGS. 3 and 4, there may be as many blades 53 as desirable. Blades 53 may also have the curved shape illustrated in FIG. 2. Thus, the blades 53 may be used in the structure illustrated in FIGS. 1 and 2 and blades 15 (either straight or curved) illustrated in FIGS. 1 and 2, may be used in FIGS. 3 and 4.

It is understood that the thickness of the beating blades, size and speed of blade rotation, and total beating time may be varied for optimum performance. While the rind or skin is tougher than fat, it is necessary to avoid excessive beating. It is also understood that in addition to the makes of machines identified here, other makes and types of machines may also be used or adapted for use to defat small pieces of animal skin.

What is claimed is:

1. In a method of de-fatting pieces of fat covered animal skin having any desired shape wherein such animal skin pieces are fed into a de-fatting machine having a beating region with dull, non-cutting, beating means and for a period where the skin pieces are beat to separate the fat from the skin pieces without substantially abrading or cutting the skin, the improvement comprising beating said fat covered skin pieces with said beating means when the skin pieces are initially in a frozen condition.

2. The method of claim 1 wherein the pieces of fat covered animal skin are in a frozen state when initially fed into the de-fatting machine and the beating thereof is commenced before the pieces have thawed.

References Cited

UNITED STATES PATENTS

| 2,072,681 | 3/1937 | Meeker et al. | 146—67 |
| 2,785,719 | 3/1957 | Dufault et al. | 146—226 |
| 2,918,956 | 12/1959 | Otto | 146—68 |

W. GRAYDON ABERCROMBIE, Primary Examiner

U.S. Cl. X.R.

146—76, 228